2,730,549
PREPARATION OF A POLYENE ALDEHYDE

Otto Isler, Marc Montavon, and Rudolf Rüegg, Basel, and Paul Zeller, Neuallschwil, Switzerland, assignors to Hoffmann-La Roche Inc., Nutley, N. J., a corporation of New Jersey No Drawing. Application June 10, 1954,
Serial No. 435,936

Claims priority, application Switzerland June 29, 1953

13 Claims. (Cl. 260—598)

This invention relates to an improvement in the synthesis of the compound 2,6-dimethyl-8-(2,6,6-trimethyl-1-cyclohexenyl)2,4,6-octatrien-1-al, and to novel intermediates and processes useful in practicing this improved synthesis. The above identified compound, often referred to by the abbreviated designation "β-$C_{19}$-aldehyde," is useful in the synthesis of β-carotene, as described in the prior publications of Inhoffen and collaborators, see for instance "Annalen der Chemie," 570, 54–69 (1950).

A quick survey of the invention is afforded by the following flow sheet, wherein each of the symbols R represents a lower alkyl radical; these radicals R need not be identical. In the flow sheet, there are inserted, opposite the formulas representing the respective products of the various stages of the synthesis, abbreviated designations by which it will on occasion be convenient to refer to those products. The systematic nomenclatures for each of said products also appear, under the abbreviated designations.

*Flow sheet*

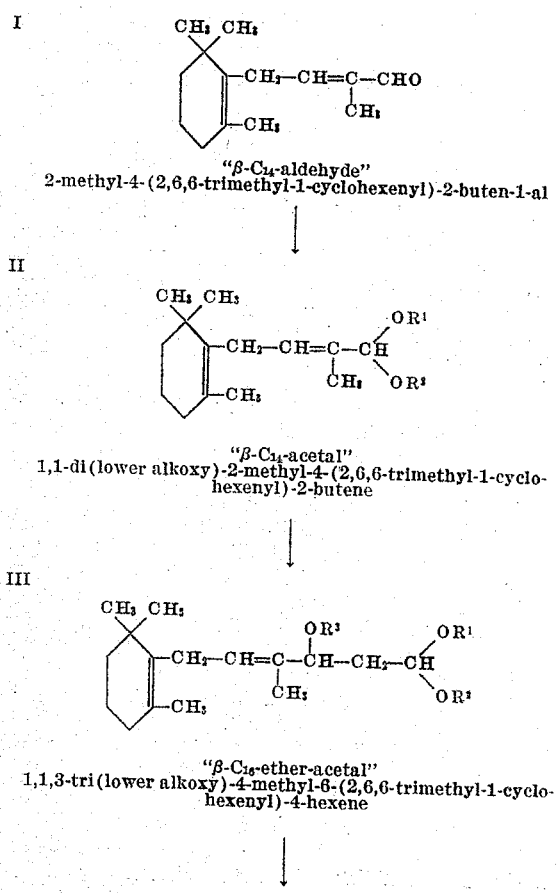

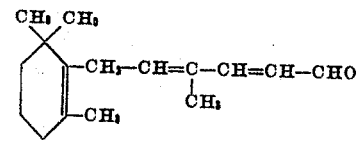

"β-$C_{16}$-aldehyde"
4-methyl-6-(2,6,6-trimethyl-1-cyclohexenyl)-2,4-hexadien-1-al

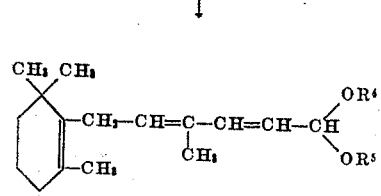

"β-$C_{16}$-acetal"
1,1-di(lower alkoxy)-4-methyl-6-(2,6,6-trimethyl-1-cyclohexenyl)-2,4-hexadiene

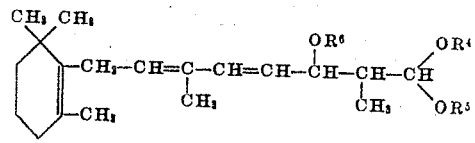

"β-$C_{19}$-ether-acetal"
1,1,3-tri(lower-alkoxy)-2,6-dimethyl-8-(2,6,6-trimethyl-1-cyclohexenyl)-4,6-octadiene

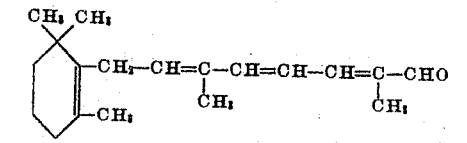

"β-$C_{19}$-aldehyde"
2,6-dimethyl-8-(2,6,6-trimethyl-1-cyclohexenyl)-2,4,6-octatrien-1-al A comprehensive embodiment of the invention, employing the same sequence of separate steps shown in the flow sheet, is exemplified by a process which comprises reacting 2-methyl-4-(2,6,6-trimethyl-1-cyclohexenyl)-2-buten-1-al (I, β-$C_{14}$-aldehyde) with a tri(lower alkyl)ester of a lower orthoalkanoic acid in the presence of an acidic condensation agent to produce 1,1-di(lower alkoxy) - 2 - methyl - 4 - (2,6,6, - trimethyl - 1 - cyclohexenyl)-2-butene (II, β-$C_{14}$-acetal), reacting the latter with vinyl lower alkyl ether in the presence of an acidic condensation agent to produce 1,1,3-tri(lower alkoxy)- 4 - methyl - 6 - (2,6,6 - trimethyl - 1 - cyclohexenyl)- 4-hexene (III, β-$C_{14}$-ether acetal), hydrolyzing the latter in aqueous acid medium to produce 4-methyl-6-(2,6,6-trimethyl - 1 - cyclohexenyl) 2,4 - hexadien - 1 - al (IV, β-$C_{16}$-aldehyde), reacting the latter with a tri(lower alkyl)-ester of a lower orthoalkanoic acid in the presence of an acidic condensation agent to produce 1,1-di(lower alkoxy) - 4 - methyl - 6 - (2,6,6 - trimethyl - 1 - cyclohexenyl)-2,4-hexadiene (V, β-$C_{16}$-acetal), reacting the latter with propenyl lower alkyl ether in the presence of an acidic condensation agent to produce 1,1,3-tri(lower alkoxy) - 2,6 - dimethyl - 8 - (2,6,6 - trimethyl - 1 - cyclohexenyl)-4,6-octadiene (VI, β-$C_{19}$-ether-acetal), and hydrolyzing the latter in aqueous acid medium to produce 2,6 - dimethyl - 8 - (2,6,6 - trimethyl - 1 - cyclohexenyl)- 2,4,6-octatrien-1-al (VII, β-C$_{19}$-aldehyde).

Additional aspects of the invention are exemplified by the novel intermediates referred to in the above flow sheet as β-C$_{14}$-acetal, β-C$_{16}$-ether-acetal, β-C$_{16}$-aldehyde, β-C$_{16}$-acetal, β-C$_{19}$-ether-acetal; and the novel processes herein disclosed of making these intermediates; as well as the novel step herein disclosed of converting β-C$_{19}$-ether-acetal to β-C$_{19}$-aldehyde.

The first step in the procedure described in detail below comprises the acetalization of β-C$_{14}$-aldehyde. This can be accomplished according to acetalization procedures known per se. For example, the acetalization can be effected by reaction of the aldehyde with an ester of an ortho carboxylic acid in the presence of an acidic condensation agent such as boron trifluoride etherate, zinc chloride, ammonium chloride, ammonium nitrate, p-toluenesulfonic acid, phosphoric acid, etc. Especially suitable for this purpose are the ortho esters of lower aliphatic acids with lower aliphatic alcohols, preferably the trimethyl, triethyl, or tri-n-butyl ester of orthoformic acid. The acetals of β-C$_{14}$-aldehyde thus obtained are colorless oils, which show no maximal absorption in the ultraviolet spectrum above 225 mμ. Special purification thereof, e. g. by distillation, is not necessary for further processing according to the invention.

In the second step of the procedure, β-C$_{14}$-acetal is condensed with a vinyl ether in the presence of an acidic condensation agent to produce β-C$_{16}$-ether-acetal. Suitable condensation agents are boron trifluoride etherate, zinc chloride, titanium tetrachloride, aluminum chloride, ferric chloride, stannic chloride, etc. It is advantageous to employ the vinyl ether of the same alcohol with which the β-C$_{14}$-aldehyde has been acetalized, e. g. by reacting β-C$_{14}$-aldehyde-dimethyl acetal with methyl vinyl ether, the corresponding diethyl acetal with ethyl vinyl ether, the corresponding di-n-butyl acetal with n-butyl vinyl ether, etc. The condensation should be effected at the lowest temperature possible; thereby undesired side reactions can be avoided, such as polymerization or condensation with the vinyl ether of the β-C$_{16}$-ether-acetal produced. The optimal reaction temperature lies between 25 and 60° C., depending upon the condensation agent chosen and the β-C$_{14}$-acetal and the vinyl lower alkyl ether chosen for the reaction. In a preferred exemplification of the process, approximately equimolar quantities of β-C$_{14}$-acetal and of the vinyl ether are reacted with each other at about 25–50° C. There are thus obtained β-C$_{16}$-ether-acetals of high purity in almost quantitative yields. These products are colorless oils, which show no maximal absorption in the ultraviolet spectrum above 225 mμ. For further processing according to the invention, it is not necessary to resort to special purification procedures, such as distillation of the product.

The third step of the novel procedure comprises subjecting the β-C$_{16}$-ether-acetal to hydrolysis in aqueous acid medium according to hydrolysis procedures known per se; this reaction is advantageously so carried out, e. g. by heating to about 100° C., that β-C$_{16}$-aldehyde is simultaneously produced by splitting out alcohol between the 2,3-positions. It is suitable to carry out this step of the reaction in the presence of water-soluble organic or inorganic acids, e. g. p-toluenesulfonic acid, acetic acid, oxalic acid, sulfuric acid, phosphoric acid, or with water-soluble salts of acidic reaction, such as zinc chloride and sodium bisulfate. It is desirable to exclude oxygen during the reaction and to work under conditions such that the alcohol produced can be continuously distilled from the reaction mixture. A water-miscible solvent such as dioxan, tetrahydrofuran, ethylene glycol dimethyl ether, etc., can be added to the reaction mixture in order to obtain a homogeneous reaction phase. One preferred method of operation is to heat β-C$_{16}$-ether-acetal with dilute aqueous phosphoric acid in the presence of a solvent miscible with water. Another preferred mode of operation is to heat β-C$_{16}$-ether-acetal with acetic acid or propionic acid; sodium acetate may be added. Upon dilution of the reaction mixture with water, crystalline β-C$_{16}$-aldehyde is precipitated, which can be purified by recrystallization, e. g. from methyl alcohol or petroleum ether.

The fourth step of the herein described procedure is the acetalization of β-C$_{16}$-aldehyde. This step can be effected in generally the same manner described above in connection with the acetalization of β-C$_{14}$-aldehyde. The acetals of the β-C$_{16}$-aldehydes obtained according to the present invention are colorless oils, which show an absorption maximum in the ultraviolet spectrum at 237–238 mμ, and in this respect can be distinguished from the corresponding acetals of β-C$_{14}$-aldehyde, which, as noted above, show no absorption maximum above 225 mμ. As in the case of the acetals of β-C$_{14}$-aldehyde, so also with the acetals of β-C$_{16}$-aldehyde, it is not obligatory to subject the latter to special purification procedures, such as distillation, before working them up in the subsequent fifth step of the process.

Said fifth step of the process comprises reacting the β-C$_{16}$-acetal with propenyl lower alkyl ether in the presence of an acidic condensation agent to produce β-C$_{19}$-ether-acetal. Suitable condensation agents are boron trifluoride etherate, zinc chloride, titanium tetrachloride, aluminum chloride, ferric chloride, stannic chloride, etc. It is advantageous to use the propenyl ether of the same alcohol with which the β-C$_{16}$-aldehyde has been acetalized, e. g. by reacting β-C$_{16}$-aldehyde dimethyl-acetal with methyl propenyl ether, or by reacting β-C$_{16}$-aldehyde diethyl-acetal with ethyl propenyl ether or by reacting β-C$_{16}$-aldehyde di-n-butyl acetal with n-butyl propenyl ether. The condensation should be effected at the lowest reaction temperature possible; thereby undesired side reactions such as polymerization and condensation with the propenyl ether of the β-C$_{19}$-ether-acetal formed are avoided. The optimal reaction temperature lies between about 25° and 60° C., according to the choice of the condensation agent and of the β-C$_{16}$-acetal and the propenyl lower alkyl ether selected for the condensation. In a preferred exemplification of this step, approximately equimolar quantities of β-C$_{16}$-acetal and of the propenyl ether are reacted with each other at about 25–50° C. There are thus obtained β-C$_{19}$-ether-acetals of high purity in almost quantitative yields. These products are colorless oils which show an absorption maximum in the ultraviolet spectrum at 237 mμ and are thereby distinguishable from the corresponding β-C$_{16}$-ether-acetals which, as noted above, show no absorption maximum above 225 mμ. For purposes of further processing in the improved synthesis of the invention, it is unnecessary to subject the β-C$_{19}$-ether-acetals to special purification procedures such as distillation.

The final step in the process of the invention comprises hydrolyzing β-C$_{19}$-ether-acetal in aqueous acid medium according to hydrolysis procedures known per se. This hydrolysis can be effected in generally the same manner described above in connection with the hydrolysis of β-C$_{16}$-ether-acetal. One preferred method of operation is to heat the β-C$_{19}$-ether-acetal with dilute phosphoric acid in the presence of a water-miscible solvent to about 100° C. Another preferred mode of procedure is to heat β-C$_{19}$-ether-acetal with acetic acid or propionic acid; sodium acetate may be added. Upon dilution of the reaction mixture with water, the crystalline β-C$_{19}$-aldehyde precipitates, and can be purified by recrystallization, e. g. from petroleum ether or methanol.

In order to avoid diminution of yields due to polymerization and decomposition, it is desirable to avoid temperatures exceeding 120° C. throughout the entire synthesis, and it is especially desirable to work up the β-C$_{14}$-acetal, β-C$_{16}$-ether-acetal, β-C$_{16}$-acetal and β-C$_{19}$-ether-acetal without distilling said intermediates. It will accordingly be understood that, whereas the synthesis is described for purposes of disclosure as comprising six separate process stages, it may be desirable to integrate one or more of these stages into a combined operation, as illustrated for instance in Example 4 below, and also in Example 8 below.

It is advantageous also, in all stages of the synthesis, to exclude oxygen and to work in the presence of an antioxidant such as hydroquinone, α-tocopherol, etc.

The invention is further disclosed in the following examples, which are illustrative but not limitative thereof:

Example 1

FROM β-$C_{14}$-ALDEHYDE TO β-$C_{14}$-ACETAL

A mixture of 206 g. of 2-methyl-4-(2,6,6-trimethyl-1-cyclohexenyl)-2-buten-1-al and 193 g. of orthoformic acid triethyl ester was mixed with a warm solution of 3.6 g. of ammonium nitrate in 70 ml. of absolute ethanol and allowed to stand at room temperature for at least 24 hours. Then the reaction mixture was taken up in ether, shaken with sodium bicarbonate solution and dried over potassium carbonate. The ether solution was concentrated and the residue was distilled under high vacuum. There was thus obtained 257 g. of 1,1-diethoxy-2-methyl-4-(2,6,6-trimethyl-1-cyclohexenyl)-2-butene, B. P. 100° C./0.4 mm., $n_D^{21}$=1.4773.

In analogous manner, but substituting orthoformic acid trimethyl ester in lieu of orthoformic acid triethyl ester, there was obtained 1,1-dimethoxy-2-methyl-4-(2,6,6-trimethyl-1-cyclohexenyl)-2-butene, B. P. 157° C./14 mm., $n_D^{27}$=1.4800. Similarly, by substituting orthoformic acid tri-n-butyl ester, the product obtained was 1,1-di-n-butoxy-2-methyl-4-(2,6,6-trimethyl-1-cyclohexenyl)-2-butene, B. P. 133° C./0.3 mm., $n_D^{25}$=1.4739. By substituting orthoformic acid tri-isobutyl ester, the product obtained was 1,1-di-isobutoxy-2-methyl-4-(2,6,6-trimethyl-1-cyclohexenyl)-2-butene, B. P. 124° C./0.01 mm., $n_D^{22}$=1.4700.

Example 2

FROM β-$C_{14}$-ACETAL to β-$C_{16}$-ETHER-ACETAL 280 g. of 1,1-diethoxy-2-methyl-4-(2,6,6-trimethyl-1-cyclohexenyl)-2-butene and 1 g. of anhydrous zinc chloride were heated to 40° C. while stirring. 76 g. of ethyl vinyl ether were gradually added to the reaction mixture, the rate of addition being regulated so that the reaction temperature remained between 40 and 45° C. After completion of the addition, stirring was continued for an additional hour at 45° C., then the reaction mixture was taken up in ether, washed with dilute sodium hydroxide solution and dried over potassium carbonate. The ether solution was concentrated and the residue was distilled in high vacuum. There was thus obtained 320 g. of 1,1,3-triethoxy-4-methyl-6-(2,6,6-trimethyl-1-cyclohexenyl)-4-hexene, B. P. 127–129° C./0.01 mm., $n_D^{24}$=1.4705.

In the same manner, by reacting 1,1-diethoxy-2-methyl-4-(2,6,6-trimethyl-1-cyclohexenyl)-2-butene with methyl vinyl ether there was obtained 1,3-diethoxy-1-methoxy-4-methyl-6-(2,6,6-trimethyl-1-cyclohexenyl)-4-hexene, B. P. 125° C./0.2 mm., $n_D^{25}$=1.4720.

By similarly reacting 1,1-dimethoxy-2-methyl-4-(2,6,6-trimethyl-1-cyclohexenyl)-2-butene with ethyl vinyl ether there was obtained 1-ethoxy-1,3-dimethoxy-4-methyl-6-(2,6,6-trimethyl-1-cyclohexenyl)-4-hexene, B. P. 127° C./0.03 mm., $n_D^{25}$=1.4760. Similarly, by reacting 1,1-di-n-butoxy-2-methyl-4-(2,6,6-trimethyl-1-cyclohexenyl)-2-butene with n-butyl vinyl ether, there was obtained 1,1,3-tri-n-butoxy-4-methyl-6-(2,6,6-trimethyl-1-cyclohexenyl)-4-hexene, B. P. 155–160° C./0.01 mm., $n_D^{27}$=1.4692.

Example 3

FROM β-$C_{16}$-ETHER-ACETAL TO β-$C_{16}$-ALDEHYDE

A mixture of 500 g. of 1,1,3-triethoxy-4-methyl-6-(2,6,6-trimethyl-1-cyclohexenyl)-4-hexene, 4000 ml. of dioxan, 1200 ml. of water and 180 ml. of 87 per cent aqueous phosphoric acid was heated for eight hours at about 100° C. in a nitrogen atmosphere and in the presence of a trace of hydroquinone as antioxidant. During this operation about 1200 to 1500 ml. of a dioxan-water-alcohol mixture was distilled off; the volume of the reaction mixture was, however, maintained constant by gradual addition of a mixture of dioxan-water (4:1). At the end of the reaction, the mixture was poured upon 6000 g. of ice, made weakly alkaline with solid sodium bicarbonate, and the crystalline precipitate was sucked off, washed with a little water and recrystallized from methyl alcohol. There was thus obtained 250 g. of crystalline 4-methyl-6-(2,6,6-trimethyl-1-cyclohexenyl)-2,4-hexadien-1-al. This previously unknown β-$C_{16}$-aldehyde, which possesses a very distinct capacity for crystallization from solvents, melts at 78–79° C., U. V. Max: 284 mμ, ε=30600 (in undenatured 95 per cent ethanol) or 275 mμ, ε=31750 (in petroleum ether). The semicarbazone, colorless leaflets from methanol, melts at 211–212° C. (in an evacuated capillary tube). The 2,4-dinitrophenylhydrazone, red leaflets from methylene chloride-methanol, melts at 200–201° C. (in an evacuated capillary tube).

In analogous manner, the following compounds were subjected to hydrolysis by the procedure described above, resulting in the production of 4-methyl-6-(2,6,6-trimethyl-1-cyclohexenyl)-2,4-hexadien-1-al:

1,3 - diethoxy - 1 - methoxy - 4 - methyl - 6 - (2,6,6 - trimethyl-1-cyclohexenyl)-4-hexene.

1 - ethoxy - 1,3 - dimethoxy - 4 - methyl - 6 - (2,6,6 - trimethyl-1-cyclohexenyl)-4-hexene.

1,1,3 - tri - n - butoxy - 4 - methyl - 6 - (2,6,6 - trimethyl - 1-cyclohexenyl)-4-hexene.

The hydrolysis of 1,1,3-tri-n-butoxy-4-methyl-6-(2,6,6-trimethyl-1-cyclohexenyl)-4-hexene gave somewhat inferior results to those obtained on hydrolysis of the other β-$C_{16}$-ether-acetals indicated above, presumably because of the higher temperature required for the splitting out and distillation of n-butyl alcohol from the ether-acetal.

Example 4

FROM β-$C_{14}$-ALDEHYDE TO β-$C_{16}$-ALDEHYDE 206 g. of 2-methyl-4-(2,6,6-trimethyl-1-cyclohexenyl)-2-buten-1-al were acetalized with orthoformic acid triethyl ester as described in Example 1. After concentration of the ether solution, the residue was freed in vacuo of excess orthoformic acid triethyl ester as well as of the ethyl formate produced during the reaction. The residual crude 1,1-diethoxy-2-methyl-4-(2,6,6-trimethyl-1-cyclohexenyl)-2-butene, without further purification, was mixed with 0.5 ml. of boron trifluoride etherate, and then 96 ml. of ethyl vinyl ether were gradually added at a temperature of 40–45° C. while stirring. Stirring was continued for an additional hour at 40–45° C., then 2900 ml. of dioxan, 850 ml. of water and 125 ml. of 87 per cent aqueous phosphoric acid were added and the mixture was heated at about 100° C. for 8 hours in a nitrogen atmosphere and in the presence of a trace of hydroquinone. During the heating, about 850–1000 ml. of a dioxan-water-alcohol mixture distilled off. The volume of the reaction mixture was maintained constant by gradual addition of a dioxan-water mixture (4:1). At the conclusion of the reaction, the mixture was poured upon 4000 g. of an ice and water mixture, extracted with 2000 ml. of ether, the ether solution was washed with sodium bicarbonate solution and water and dried over sodium sulfate. After evaporating off the ether, the residue was crystallized from petroleum ether. There was thus obtained 4-methyl-6-(2,6,6-trimethyl-1-cyclohexenyl) - 2,4 - hexadien-1-al in the form of colorless crystals of M. P. 78–79° C.

Example 5

FROM β-$C_{16}$-ALDEHYDE TO β-$C_{16}$-ACETAL

A warm solution of 300 g. of 4-methyl-6-(2,6,6-trimethyl-1-cyclohexenyl)-2,4-hexadien-1-al in 270 g. of orthoformic acid triethyl ester was mixed with a warm solution of 5 g. of ammonium nitrate in 90 ml. of alcohol and allowed to stand for 24 hours, during which time the mixture gradually reached room temperature. The reaction mixture was then taken up in ether, shaken with sodium bicarbonate solution and dried over potassium carbonate. The ether solution was concentrated and the residue freed in vacuo at 70° C. of excess orthoformic acid triethyl ester and of ethyl formate produced during the reaction. There was thus obtained 397 g. of crude 1,1-diethoxy-4-methyl - 6 - (2,6,6 - trimethyl - 1 - cyclohexenyl) - 2,4 - hexadiene, which showed an absorption maximum in the ultraviolet spectrum at 237 m$\mu$ ($\epsilon$=26200), and which could be used for further reaction without additional purification. Upon distillation of the crude material, a colorless product of B. P. 135° C./0.1 mm., and $n_D^{25}$=1.5082 was obtained.

In analogous manner, except substituting orthoformic acid trimethyl ester for orthoformic acid triethyl ester, there was obtained 1,1-dimethoxy-4-methyl-6-(2,6,6-trimethyl-1-cyclohexenyl)-2,4-hexadiene, B. P. 120–122° C./0.02 mm., $n_D^{22}$=1.5092. Similarly, when substituting orthoformic acid tri-n-butyl ester, there was obtained 1,1-di - n - butoxy - 4 - methyl - 6 - (2,6,6 - trimethyl - 1 - cyclohexenyl)-2,4-hexadiene, B. P. 165° C./0.02 mm., $n_D^{29}$=1.4962.

*Example 6*

FROM $\beta$-C$_{16}$-ACETAL TO $\beta$-C$_{19}$-ETHER-ACETAL 397 g. of crude 1,1-diethoxy-4-methyl-6-(2,6,6-trimethyl-1-cyclohexenyl)-2,4-hexadiene as produced in the preceding example and 0.5 ml. of boron trifluoride etherate were gradually mixed while stirring at 45° C. with 98 g. of ethyl propenyl ether. The rate of addition was regulated so that the reaction temperature remained between 40 and 45° C. The stirring was continued for an additional three hours at 45° C., and then the reaction mixture was taken up in ether, washed with dilute sodium hydroxide solution and dried over potassium carbonate. After concentration of the ether solution there was obtained 467 g. of crude 1,1,3-triethoxy-2,6-dimethyl - 8 - (2,6,6 - trimethyl - 1 - cyclohexenyl) - 4,6 - octadiene, which was, however, pure enough for further processing. By distillation of the crude material in a high vacuum, there was obtained a purified colorless 1,1,3-triethoxy - 2,6 - dimethyl - 8 - (2,6,6-trimethyl - 1 - cyclohexenyl)-4,6-octadiene, B. P. 159° C./0.05 mm., $n_D^{24}$=1.4932, U. V. Max: 237 m$\mu$, $\epsilon$=32400.

In analogous manner, except substituting methyl propenyl ether for ethyl propenyl ether, there was obtained 1,1,3-trimethoxy-2,6-dimethyl - 8 - (2,6,6 - trimethyl - 1-cyclohexenyl)-4,6-octadiene, B. P. 137° C./0.01 mm., $n_D^{28}$=1.5010. Similarly, when substituting n-butyl propenyl ether, there was obtained 1,1,3-tri-n-butoxy-2,6 - dimethyl - 8 - (2,6,6 - trimethyl - 1 - cyclohexenyl) - 4,6-octadiene, B. P. 195–200° C./0.03 mm., $n_D^{22}$=1.4894.

Methyl propenyl ether, B. P. 45–47° C., $n_D^{25}$=1.3850, was obtained by catalytic dealcoholation of propionaldehyde dimethylacetal, by heating the latter to about 290° C. in the presence of clay chips and potassium bisulfate, cf. Voronkov, "Chemical Abstracts" 45, 5607–8 (1951). Similarly, n-butyl propenyl ether, B. P. 120° C., $n_D^{23}$=1.4100, was prepared from propionaldehyde di(n-butyl)acetal by catalytic dealcoholation.

*Example 7*

FROM $\beta$-C$_{19}$-ETHER-ACETAL TO $\beta$-C$_{19}$-ALDEHYDE

A mixture of 200 g. of 1,1,3-triethoxy-2,6-dimethyl-8 - (2,6,6 - trimethyl - 1 - cyclohexenyl) - 4,6 - octadiene, 1600 ml. of dioxan, 400 ml. of water and 70 ml. of 87 per cent aqueous phosphoric acid was heated at about 100° C. for 5–7 hours in a nitrogen atmosphere and in the presence of a trace of hydroquinone as antioxidant. During the heating, about 1000 ml. of a dioxan-water-alcohol mixture distilled off, but the volume of the reaction mixture was maintained approximately constant by addition of a 4:1 mixture of dioxan-water. At the end of the reaction, the mixture was poured upon 3000 g. of ice, extracted with ether, the ether solution was washed with sodium bicarbonate solution and water, dried over sodium sulfate and concentrated. The residue was crystallized from petroleum ether to yield about 100 g. of 2,6-dimethyl - 8 - (2,6,6 - trimethyl - 1 - cyclohexenyl) - 2,4,6-octatrien-1-al, yellow crystals, M. P. 62–63° C., B. P. 130–132° C./0.03 mm. This substance possesses a very marked capacity for crystallization from petroleum ether.

In the same manner, 1,1,3-trimethoxy-2,6-dimethyl-8-(2,6,6-trimethyl-1-cyclohexenyl)-4,6-octadiene and 1,1,3-tri - n - butoxy - 2,6 - dimethyl - 8 - (2,6,6 - trimethyl - 1-cyclohexenyl)-4,6-octadiene were hydrolyzed to produce 2,6 - dimethyl - 8 - (2,6,6 - trimethyl - 1 - cyclohexenyl) - 2,4,6-octatrien-1-al. As in the case of hydrolysis of the $\beta$-C$_{16}$-ether-acetals, so also when hydrolyzing the $\beta$-C$_{19}$-ether-acetals, the tri-n-butyl compound gave somewhat inferior results to those obtained when hydrolyzing the analogous trimethyl and triethyl $\beta$-C$_{19}$-ether-acetals.

*Example 8*

FROM $\beta$-C$_{16}$-ALDEHYDE TO $\beta$-C$_{19}$-ALDEHYDE

A mixture of 2400 g. of 4-methyl-6-(2,6,6-trimethyl-1-cyclohexenyl)-2,4-hexadien-1-al, 2000 g. of orthoformic acid triethyl ester and 93 g. of orthophosphoric acid in 510 g. of absolute ethanol was stirred for 15 hours at 20–25° C. During that time, complete solution was obtained. 210 g. of dry pyridine were then added at 20° C., while cooling, whereupon the mixture was poured, while stirring, on a mixture of 2000 g. of sodium bicarbonate and 1000 g. of ice. The lower aqueous layer was discarded. The upper layer was purified by distilling off the volatile by-products in vacuo. The refractive index of the 1,1-diethoxy-4-methyl-6-(2,6,6-trimethyl-1-cyclohexenyl)-2,4-hexadiene thus obtained was $n_D^{25}$=1.5015. This product was mixed with 80 ml. of a 10 per cent solution of zinc chloride in ethyl acetate, whereupon 935 g. of ethyl propenyl ether were added dropwise to the mixture within about two hours, the temperature being kept between 20 and 25° C. Stirring was then continued for 12–15 hours at the same temperature. The refractive index of the product was now $n_D^{25}$=1.4840. It was added to a mixture of 730 g. of sodium acetate, 360 ml. of water and 7700 g. of acetic acid. The mixture was heated to 95° C. for six hours, then cooled to 30° C. and added, with efficient stirring, to a mixture of 11000 g. of water and 11000 g. of ice. 2,6-dimethyl-8-(2,6,6-trimethyl-1-cyclohexenyl)-2,4,6-octatrien-1-al crystallized out and was filtered off and washed with 3000 ml. of water. By recrystallizing from methanol, the melting point was raised to 66–68° C.

We claim:

1. A process which comprises reacting 2-methyl-4-(2,6,6-trimethyl-1-cyclohexenyl)-2-buten-1-al with a tri-(lower alkyl) ester of a lower orthoalkanoic acid in the presence of an acidic condensation agent to produce 1,1-di(lower alkoxy) - 2 - methyl - 4 - (2,6,6 - trimethyl - 1-cyclohexenyl)-2-butene, reacting the latter with vinyl lower alkyl ether in the presence of an acidic condensation agent to produce 1,1,3-tri(lower alkoxy)-4-methyl-6-(2,6,6-trimethyl-1-cyclohexenyl)-4-hexene, hydrolyzing the latter in aqueous acid medium to produce 4-methyl-6-(2,6,6-trimethyl-1-cyclohexenyl)-2,4-hexadien-1-al, reacting the latter with a tri(lower alkyl) ester of a lower orthoalkanoic acid in the presence of an acidic condensation agent to produce 1,1-di(lower alkoxy)-4-methyl-6-(2,6,6-trimethyl-1-cyclohexenyl)-2,4-hexadiene, reacting the latter with propenyl lower alkyl ether in the presence of an acidic condensation agent to produce 1,1,3-tri(lower alkoxy) - 2,6 - dimethyl - 8 - (2,6,6 - trimethyl - 1-cyclohexenyl)-4,6-octadiene, and hydrolyzing the latter in aqueous acid medium to produce 2,6-dimethyl - 8 - (2,6,6-trimethyl-1-cyclohexenyl)-2,4,6-octatrien-1-al.

2. A process which comprises hydrolyzing 1,1,3-tri-(lower alkoxy) - 2,6 - dimethyl - 8 - (2,6,6 - trimethyl - 1-cyclohexenyl)-4,6-octadiene in aqueous acid medium to produce 2,6-dimethyl-8-(2,6,6-trimethyl-1-cyclohexenyl)-2,4,6-octatrien-1-al.

3. A process which comprises reacting 1,1-di(lower alkoxy) - 4 - methyl - 6 - (2,6,6 - trimethyl - 1 -cyclohexenyl)-2,4-hexadiene with propenyl lower alkyl ether in the presence of an acidic condensation agent to produce 1,1,3 - tri(lower alkoxy) - 2,6 - dimethyl - 8-(2,6,6 - trimethyl-1-cyclohexenyl)-4,6-octadiene.

4. 1,1,3 - tri(lower alkoxy) - 2,6 - dimethyl - 8 - (2,6,6-trimethyl-1-cyclohexenyl)-4,6-octadiene.

5. A compound according to claim 4 in which each alkoxy radical has not more than two carbon atoms.

6. A process which comprises reacting 4-methyl-6-(2,6,6-trimethyl-1-cyclohexenyl)-2,4-hexadien-1-al with a tri(lower alkyl) ester of a lower orthoalkanoic acid in the presence of an acidic condensation agent to produce 1,1 - di(lower alkoxy) - 4 - methyl - 6 - (2,6,6 - trimethyl - 1-cyclohexenyl)-2,4-hexadiene.

7. 1,1 - di(lower alkoxy) - 4 - methyl -6 - (2,6,6 - tri-methyl-1-cyclohexenyl)-2,4-hexadiene.

8. A compound according to claim 7 in which each alkoxy radical has not more than two carbon atoms.

9. A process which comprises hydrolyzing 1,1,3-tri-(lower alkoxy) - 4 - methyl - 6 - (2,6,6 - trimethyl - 1 - cyclohexenyl)-4-hexene in aqueous acid medium to produce 4 - methyl - 6 - (2,6,6 - trimethyl - 1 - cyclo - hexenyl)-2,4-hexadien-1-al.

10. 4 - methyl - 6 - (2,6,6 - trimethyl - 1 - cyclo - hexenyl)-2,4-hexadien-1-al.

11. A process which comprises reacting 1,1-di(lower alkoxy) - 2 - methyl - 4 - (2,6,6 - trimethyl - 1 - cyclo - hexenyl)-2-butene with vinyl lower alkyl ether in the presence of an acidic condensation catalyst to produce 1,1,3 - tri(lower alkoxy) - 4 - methyl - 6 - (2,6,6 - tri-methyl-1-cyclohexenyl)-4-hexene.

12. 1,1,3 - tri(lower alkoxy) - 4 - methyl - 6 - (2,6,6 - trimethyl-1-cyclohexenyl)-4-hexene.

13. A compound according to claim 12 in which each alkoxy radical has not more than two carbon atoms.

References Cited in the file of this patent
UNITED STATES PATENTS

| | | |
|---|---|---|
| 2,451,735 | Isler | Oct. 19, 1948 |
| 2,586,305 | Copenhaver | Feb. 19, 1952 |